June 22, 1937.  S. FINDLATER  2,084,332
APPARATUS FOR MAKING TAPERED TUBULAR WORKPIECES
Filed Dec. 29, 1934  3 Sheets-Sheet 2

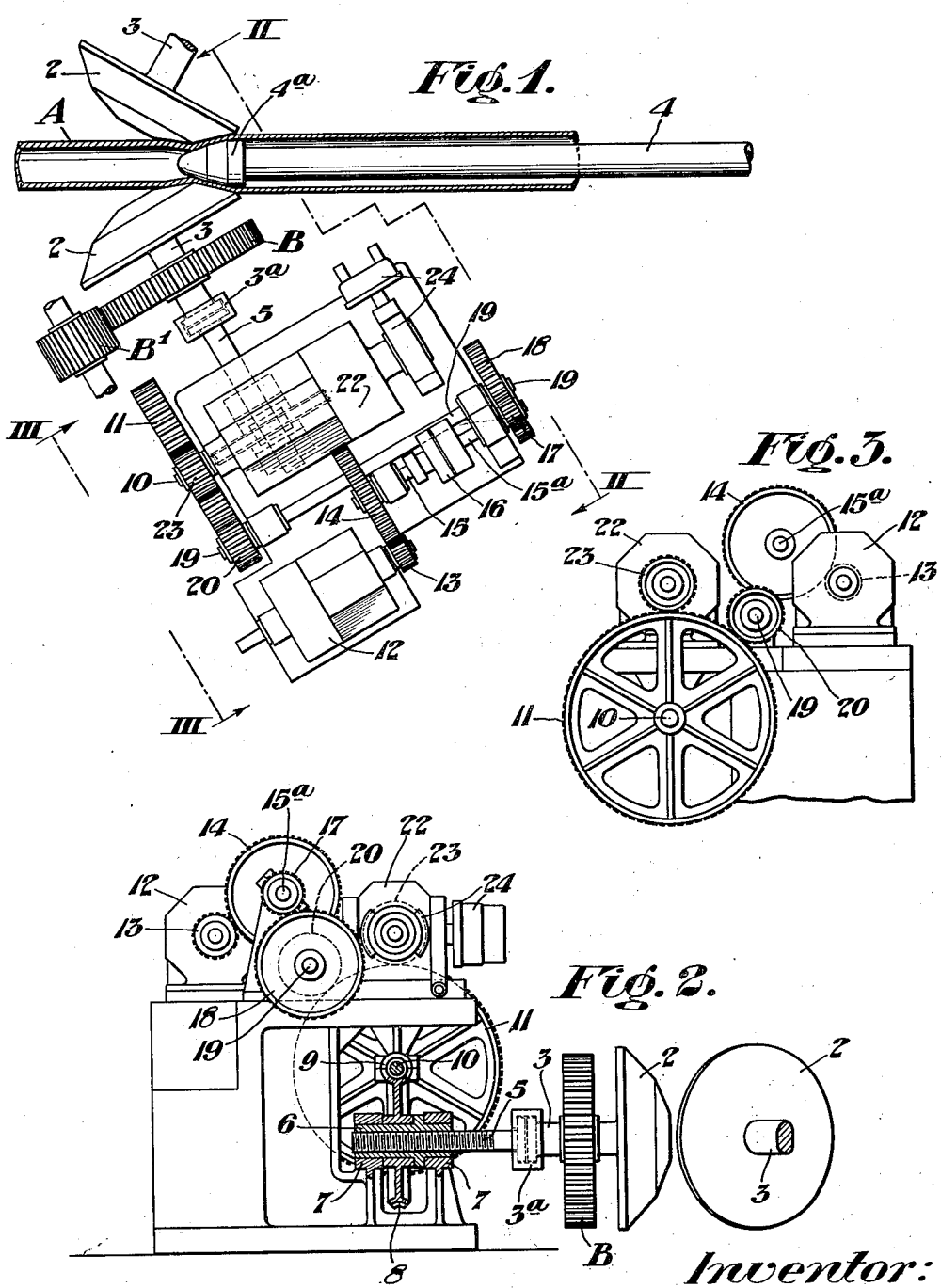

Fig. 4.

Inventor:
STEVENSON FINDLATER,
by Usina & Rauber
his Attorneys.

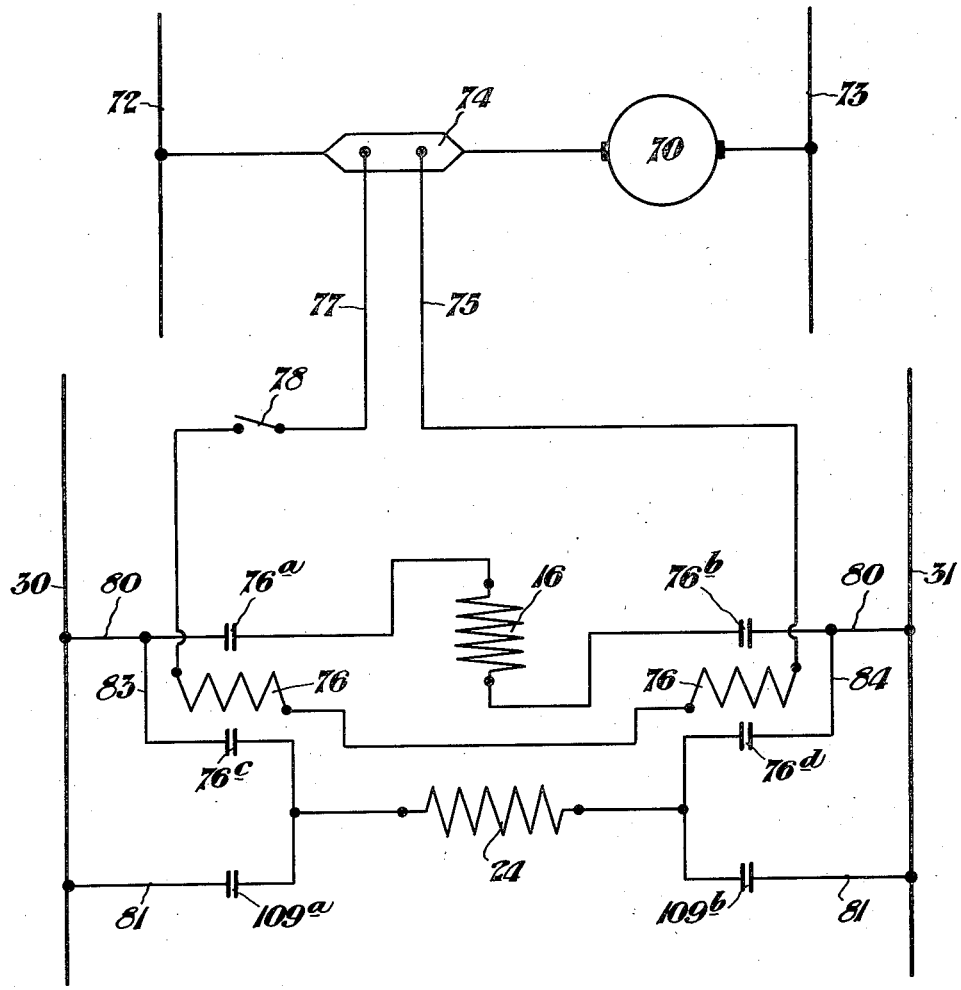

Patented June 22, 1937

2,084,332

UNITED STATES PATENT OFFICE 2,084,332

APPARATUS FOR MAKING TAPERED TUBULAR WORKPIECES

Stevenson Findlater, McKeesport, Pa., assignor to National Tube Company, a corporation of New Jersey Application December 29, 1934, Serial No. 759,803

2 Claims. (Cl. 80—13)

This invention relates to apparatus for making tapered tubular workpieces.

In constructional work of numerous types, it is very desirable to have a tapered tubular work-piece, or cantilevered section; as for example in fabricating lamp-posts, trolley poles, masts and the like. The work-pieces from which these articles are made are usually provided by the welding of skelp in such manner as to require a tubular section of varying diameter and relatively constant wall-thickness. The purpose of such a work-piece is often defeated, or its efficiency seriously impaired by way of its wall-thickness being relatively constant, rather than changing in proportion to the change in its diameter, and particularly its outside diameter.

In a copending application entitled "Seamless pipe or tube mill" filed November 21, 1934, Serial No. 754,168, I have disclosed apparatus which is in many respects similar to that disclosed herein. This copending application is, however, concerned with compensation for changes in the size of the pass of a pipe or tube mill due to the expansive influence of the highly heated work-piece.

The temperature of a seamless pipe or tube mill is usually no higher at the end of a long period of operation than it was at the beginning. This is for the reason that the mill is started without cooling water on the rolls and heated billets passed therethrough until the rolls acquire a desired temperature. At this time the rolls are sprayed with water in order that the temperature will not rise greatly beyond that desired. In this manner the general temperature of the mill is maintained as desired; but as each highly heated billet, or work-piece, moves through it, the temperature of its elements is temporarily raised. This temporary rise in temperature causes a correspondingly temporary expansion, particularly of the mandrel bar; the effects of which are overcome by the use of the invention disclosed in my co-pending application, Serial No. 754,168.

It is one of the objects of the present invention to provide a novel apparatus for making a tapered tubular work-piece in a very rapid and economical manner.

Another object is the provision of a novel method and apparatus of the class described which will operate to obtain a hollow work-piece which is not only tapered on its exterior, but is, in addition, tapered in wall-thickness.

A further object is the provision of a novel method and apparatus for making a tapered work-piece which, once initiated, will operate in an entirely automatic means, and obtain results within unusually fine tolerances, despite changes accruing from rises in temperature.

These and further objects will be apparent after referring to the drawings, in which:

Figure 1 is a plan showing the apparatus of the invention as applied to a conventional type of seamless tube mill, with the work-piece in section.

Figure 2 is a view taken on the line II—II of Figure 1, and showing part of the apparatus in section.

Figure 3 is an end elevation taken on the line III—III of Figure 1.

Figures 4 and 5 are electrical circuits for operating the various elements of the invention.

Referring more particularly to the drawings, the numeral 2 designates a pair of metal working rolls such as are conventionally used in pipe or tube mills. The rolls 2 are shown as being of the "disk" type, but might be one of a number of well known constructions. Ordinarily, in tube practice both of the metal working rolls 2 are power actuated, but it is to be understood that one of the same may be idle, and it is even within the contemplation of the invention to apply the principles thereof to any metal working mill employing a plurality of rolls which may be modified as to their relative positions in any satisfactory manner.

Each of the metal working rolls 2 is mounted on a shaft 3 and driven through suitable mechanism, such as a gear B and pinion B', the latter having an elongated surface to permit relative longitudinal movement of the gear B and shaft 3. A mandrel bar 4 is disposed in the longitudinal direction of feed of a work-piece, or tube A, and provided on one of its ends with a mandrel plug 4ᵃ which is adapted to internally support the work-piece while it is being processed by the rolls 2.

A suitable coupling 3ᵃ is provided for connecting one of the roll shafts 3 to a screw 5 and in such manner as to permit independent rotation of the roll shaft. The screw 5 is disposed in a nut 6 which is journaled for rotation in suitable bearings 7. A worm wheel 8 is keyed to the nut 6 for rotation therewith, and is in mesh with a worm 9, which is mounted on a shaft 10 of a large gear 11. A motor 12 is positioned relatively adjacent the large gear 11 and has a pinion 13 associated therewith for rotating a gear 14 which is mounted on a shaft 15. The shaft 15 carries one member of a magnetic clutch, generally indicated at 16, while a cooperating shaft 15ᵃ carries the cooperating clutch member. A pinion 17 is mounted on the shaft 15ª and in mesh with a gear 18, which is mounted on one end of a shaft 19. The shaft 19 is provided at its other end with a pinion 20 which is in constant mesh with the large gear 11.

A second motor 22 is positioned somewhat closer to the large gear 11 and is provided with a pinion 23 which is in constant mesh therewith. A suitable magnetic brake, generally indicated at 24, is provided for the motor 22. The rotation of the motor 12 is automatically compensated for differences in resistance to metal displacement caused by introducing metal of varying temperatures into the rolls. The operation is such that the variation in temperature of the work-piece being processed, as measured by photoelectric, optical radiation, or other heat responsive device, will be transmitted to the compensator motor 12, in such manner as to increase or retard the rotation thereof, thereby varying the rate at which the compensator operates.

Any suitable and conventional electric wiring circuits, including heat responsive device, relays, and preferably also push-buttons, are provided for the motors 12 and 22, the magnetic clutch device 16, and the magnetic brake 24 for the motor 22.

In operation, a work-piece A, which is shown as having been previously pierced, or otherwise made tubular, is introduced between the rolls 2 while supported internally by the mandrel plug 4ª. The tube continues through the mill until a suitable load relay, or push-button, is operated to energize the magnetic clutch 16 and release the magnetic brake 24, the rate of rotation of the shaft of the motor 12 being controlled through the suitable resistance mentioned. The rotation of this shaft permits the motor pinion 13, driving through the mechanism, or gear train 14, 17, 18, 20, 11, 9 and 8 to rotate the nut 6 and withdraw the screw 5, thereby gradually increasing the distance between the rolls 2 and the surfaces of the mandrel plug 4ª. The rate of increase of this distance is, of course, modified by the temperature of the work-piece A at numerous points along its length by means of the heat responsive device mentioned.

After the motor 12 has been actuated to cause the screws 5 to be retracted sufficiently by the nut 6, the return movement of the roll must be quickly effected pending the arrival of the next work-piece. As the pinion 23 on the shaft of the motor 22 is in constant mesh with the large gear 11, a suitable relay, or the operator attending the device, momentarily energizes the magnetic brake 24 for the motor 22. This operation at the same time instantaneously deenergizes the magnetic clutch 16 and disengages the motor 12. The motor 22 is then actuated to reverse the motion of the gear 11 to rapidly return the roll to a position predetermined by suitable limit switches which automatically stop the motor 22 and at the same time apply the brake 24.

When the motor 22 is energized, the large gear 11, which is in constant mesh with the pinion 23, causes the latter, gear 18 and pinion 17 to rotate, since the pinion 20 and gear 18 are mounted rigidly on the common shaft 19. The motion through this gear train ends here, however, because the magnetic clutch 16 is not energized, permitting the shaft of the motor 12, pinion 13, gear 14 and shaft 15 to remain at a standstill when the motion transmitted by the motor 22 returns the roll to the position required for the entry of the next work-piece.

Referring to Figures 4 and 5 of the drawings, I have disclosed, in a diagram, one form of electrical control which will function to operate the elements of the invention in the manner previously described. In this diagram the numerals 30 and 31 designate suitable power lines carrying a normal voltage; such as 220 v.

A master switch 33 is provided for operating the motor 12, which serves to retract one of the metal working rolls 2, and is connected between the power lines 30 and 31 by a line 34. The master switch 33 is provided with an operating lever 35 and the usual contacts 36, 37, 38, 39, 40 and 41. A low-voltage coil 43 is connected in the line 34 for the master switch 33, and has two pairs of contacts 43ª and 43ᵇ which it serves to actuate.

The contact 36 of the master switch 33 is connected to the line 34, between the low-voltage coil 43 and its contacts 43ª, by a line 45. A line 46 connects the contact 37 of the master switch 33 to the line 34 through the contacts 43ᵇ of the low-voltage coil 43 and has included therein a pair of coils 47.

A line 48 is connected to the contact 38 of the master switch 33 and has included therein an auxiliary switch 53ª, while a line 49 is connected to the contact 39 and has included therein an auxiliary switch 47ª. The lines 48 and 49 are connected to the line 34 through the contacts 43ᵇ of the low-voltage coil 43 by a line 50 which has included therein a coil 51.

The contact 40 of the master switch 33 is connected to the line 34 through the contacts 43ᵇ of the low-voltage coil 43 by a line 52 in which there is included a pair of coils 53.

A line 54 is provided for connecting the contact 41 of the master switch 33 through the contacts 43ᵇ of the low-voltage coil 43, and includes a series of coils 55, 56 and 57, together with an auxiliary switch 51ᵇ. The auxiliary switches, 47ª and 53ª are operated by the coils 47 and 53, respectively.

The motor 12 is connected to the power lines 30 and 31 by a line 56 and includes in its circuit contacts 47ᵇ and 47ᶜ and 53ᵇ and 53ᶜ, which are operated by the coils 47 and 53, respectively. A series of contacts 55ª, 56ª and 57ª, are also included in the line 56, together with a pair of contacts 51ª. The contacts 55ª, 56ª and 57ª are operated by the series of coils 55, 56 and 57, respectively. The auxiliary switch 51ᵇ and the contacts 51ª are both operated by the coil 51.

The heat responsive device indicated at X is connected by a line 59 with a series of relays 60, 61, 62, 63, 64 and 65, which in turn operate a field rheostat 66. Each of these relays is adjusted to trip at a definite temperature. This field rheostat is connected in a line 67 between the power lines 30 and 31, with the shunt field for the motor 12, which is designated at 12ª, and a hand operated rheostat 68.

Referring to Figure 5 of the drawings, it is to be noted that the motor for rotating the metal working rolls 2 is indicated at 70, being connected by a line 71 with suitable power lines 72 and 73. While one motor 70 is illustrated in the drawings and may be used to drive both metal working rolls 2 through the medium of suitable gearing (not shown), the invention also contemplates the driving of each roll with an individual motor. The power lines 72 and 73 furnish the motor 70 with current of a considerably higher voltage than that furnished through the power lines 30 and 31; as for instance 600 volts. A shunt 74 is icluded in the line 71 between the power line 72 and the motor 70. A line 75 connects the shunt 74 with one end of a load relay 76. Another line 77 connects the shunt 74 with the other end of the load relay 76 and has included therein a limit switch 78.

The magnetic clutch 16 which is carried on the shafts 15 and 15a is connected between the power lines 30 and 31 by a line 80, which has included therein two pairs of contacts, as at 76a and 76b. The magnetic brake 24 for the motor 22 is connected by a line 81 with the power lines 30 and 31, and includes in circuit on each side thereof a pair of contacts, as at 109a and 109b, respectively.

A line 83 is connected to the line 80 between the power line 30 and the contacts 76a and to the line 81 between the contacts 109a and the magnetic brake 24, and includes a pair of contacts 76c. A similar line 84 is connected to the line 80 between the power line 31 and the contacts 76b and to the line 81 between the contacts 109b and the magnetic brake 24 and includes a pair of contacts 76d.

The contacts 76a, 76b, 76c and 76d are all operated by the load relay 76.

A master switch 86 is provided for operating the motor 22 which returns the movable metal working roll 2 to its original position in the mill. This master switch 86 is connected between the power lines 30 and 31 by a line 87, and provided with an operating lever 88 and contacts 89, 90, 91, 92, 93 and 94. A low-voltage coil 96 is connected in the line 87 for the master switch 86 and has two pairs of contacts 96a and 96b which it serves to operate.

The contact 89 of the master switch 86 is connected to the line 87 between the low-voltage coil 96 and its contacts 96a by a line 97.

A line 98 connects the contact 90 of the master switch 86 to the line 87 through the contacts 96b of the low-voltage coil 96 and includes therein a limit switch 100 and a pair of coils 101.

A line 102 is connected to the contact 91 of the master switch 86 and includes a limit switch 103 and an auxiliary switch 113a, while a line 105 is connected to the contact 92 of the master switch 86 and has included therein a limit switch 106 and an auxiliary switch 101a. The lines 102 and 105 are connected to the line 87 through the contacts 96b of the low-voltage coil 96 by a line 108 which has included therein a pair of coils 109.

The contact 93 of the master switch 86 is connected to the line 87 through the contacts 96b of the low-voltage coil 96 by a line 110 which has included therein a limit switch 112 and a pair of coils 113.

The limit switches 100 and 103 are suitably arranged to open when the motor 22 has placed the metal working roll 2 in its original position in the mill, while the limit switches 106 and 112 are arranged to open when the roll is in its extreme remote position with respect thereto.

A line 114 connects the contact 94 of the master switch 86 to the line 87 through the contacts 96b of the low-voltage coil 96 and includes a series of coils 115, 116 and 117, and an auxiliary switch 109d.

It is to be noted that an auxiliary switch 76e is interposed between the contacts 96b of the low-voltage coil 96, and the coils 101, 109 and 113 in the lines 98, 108 and 110, respectively. The auxiliary switches 101a and 113a are operated by the coils 101 and 113, respectively.

The motor 22 is connected to the power lines 30 and 31 by a line 122 and includes in its circuit contacts 101b and 101c and 113b and 113c, which are also operated by the coils 101 and 113, respectively. The series field for the motor 22 is included in this line 122, being designated at 22a, and also a series of contacts 115a, 116a and 117a, which are operated by the coils 115, 116 and 117, respectively. A pair of contacts 109a are also included in a line 122 between the series of contacts 115a, 116a and 117a and the power line 31.

The contacts 109a, 109b, 109c and the auxiliary switch 109d are all operated by the coils 109.

In operation: The operator of the mill moves the lever 35 of the master switch 33 to the "out" position. At the time the lever 35 was resting in the "off" position, the low-voltage coil 43 was closed, and is maintained by one of its contacts 43a. The movement of the lever 35 closes the contacts 39, 40 and 41 of the master switch, thus energizing the coil 53 to open the contacts of the auxiliary switch 53a and close the contacts 53b and 53c; and the coil 51 to close the contacts 51a, and the contacts of the auxiliary switch 51b. The closing of the contacts of the auxiliary switch 51b energizes the coils 55, 56 and 57, thus closing the contacts 55a, 56a and 57a. Upon the closing of the contacts 55a, 56a and 57a the motor 12 will rotate at a speed predetermined by the setting of the hand-operated rheostat 68.

At the time of moving the lever 35 of the master switch 33 to the "out" position, the operator also moves the lever 88 of the master switch 86 to the "in" position. No operation results from this last named movement due to the fact that the metal working rolls 2 are in position to receive the work-piece A and the limit switches 100 and 103 are open.

As the work-piece A moves between the metal working rolls 2 and over the mandrel plug 4a, the power required by the motor 70 passes through the shunt 74. The "voltage drop" across the shunt energizes the load relay 76 which closes the contacts 76a, 76b, 76c and 76d and opens the auxiliary switch 76e. The closing of the contacts 76a, 76b, 76c and 76d energizes the magnetic clutch 16 and the magnetic brake 24. In this manner the motor 12 is caused to rotate the nut 6 to withdraw one of the metal working rolls 2. The speed with which the motor 12 operates is, of course, determined by the setting of the hand operated rheostat 68, as previously mentioned. By withdrawing one of the metal working rolls 2, the work-piece A will be processed without material variation in its internal diameter, or bore, but its outside diameter will gradually increase from its leading to its trailing end.

The photoelectric pyrometer device X is set for a predetermined temperature indication and if the temperature of the work-piece A, as it passes the point upon which it is "trained" is either above or below this indication, the relays 60 to 65, inclusive, are caused to function. The functioning of the relays 60 to 65, inclusive, will include or delete sections of the field rheostat 66, to increase or decrease the speed of operation of the motor 12, which is withdrawing one of the metal working rolls 2. It will thus be seen that this rate of withdrawal is in direct proportion to the temperature of the work-piece A. That is to say, the metal working roll 2 will be automatically withdrawn at an increased rate if the temperature of the work-piece A is more highly heated at certain points along its length than at others. This is for the reason that more highly heated portions of the work-piece respond most readily to displacement and therefore do not require the heavy reduction necessary to those portions thereof which are less highly heated.

The power required by the motor, or motors, 70, which drives the metal working rolls 2, will approach zero after the trailing end of the work-piece A has emerged from the mill. This causes the "voltage drop" across the shunt 74 to approach zero, and the consequent deenergization of the load relay 76. The deenergization of the load relay 76 causes the opening of the contacts 76ª, 76ᵇ, 76ᶜ and 76ᵈ, to deenergize the magnetic clutch 16 and the magnetic brake 24. The motor 12 is thus caused to cease the withdrawal of the metal working roll 2.

The opening of the contacts 76ª, 76ᵇ, 76ᶜ and 76ᵈ causes the auxiliary switch 76ᵉ to close. The closing of this auxiliary switch energizes the coils 109 and the coils 101 through the contacts 91 and 90 of the master switch 86. The energization of the coils 109 closes the contacts 109ª, 109ᵇ, 109ᶜ and the contacts of the auxiliary switch 109ᵈ. The energization of the coils 101 closes the contacts of the auxiliary switch 101ª and the contacts 101ᵇ and 101ᶜ. The closing of the contacts 109ª and 109ᵇ releases the magnetic brake 24, and the closing of the contacts of the auxiliary switch 101ª and the contacts 101ᵇ and 101ᶜ starts the motor 22.

The closing of the contacts of the auxiliary switch 109ᵈ energizes the coils 115, 116 and 117 to close the contacts 115ª, 116ª and 117ª. This brings the motor 22 up to full speed.

The limit switches 103 and 100 open when the motor 22 has restored the metal working roll 2 to its original position, the former deenergizing the coils 109 which causes the opening of the contacts 109ª, 109ᵇ, 109ᶜ and the contacts of the auxiliary switch 109ᵈ. The opening of the limit switch 100 deenergizes the coils 101 which causes the closing of the contacts of the auxiliary switch 101ª, and the opening of the contacts 101ᵇ and 101ᶜ. The opening of the various contacts effected by the opening of the limit switches 103 and 100 causes the deenergization of the motor 22 and the magnetic brake 24, thereby setting the latter.

The entire equipment is thus set for another cycle of operation, which is again initiated by the operation of the mill in the manner previously described.

It will be readily seen by those skilled in the art that the work-piece A will emerge from the mill with a gradually increasing outside diameter from its leading to its trailing end, regardless of the variations in temperature throughout its length. In addition, the various elements of the apparatus of the invention may be easily adapted to produce any desired change in the wall thickness of the work-piece A, however complex, by making simple adjustments.

I claim:

1. Apparatus for making tapered tubular work-pieces comprising, in combination, at least one power actuated metal working roll, a roll for coacting with said first named roll, a mandrel bar, a mandrel plug supported by said mandrel bar, said mandrel plug being disposed intermediate said rolls, means for withdrawing at least one of said elements to increase the distance between said rolls and the surfaces of said mandrel plug while a work-piece is being acted upon thereby, means responsive to the temperature of said work-piece for modifying the speed of operation of said withdrawing means, said withdrawing means and said last named means being constructed and cooperatively arranged to enlarge the pass while said work-piece is moving therethrough, and means for returning the withdrawn element to its initial position.

2. Apparatus for making tapered tubular work-pieces comprising, in combination, at least one power actuated metal working roll, a roll for coacting with said first named roll, a mandrel plug disposed intermediate said rolls, means for withdrawing at least one of said rolls to increase the distance therebetween while a work-piece is being acted upon thereby, means responsive to the temperature of said work-piece for modifying the speed of operation of said withdrawing means, said withdrawing means and said last named means being constructed and cooperatively arranged to enlarge the pass while said pipe or tube is moving therethrough, and means for returning the withdrawn roll to its initial position.

STEVENSON FINDLATER.